US012728493B2

(12) United States Patent
Uenishi et al.

(10) Patent No.: US 12,728,493 B2
(45) Date of Patent: Sep. 8, 2026

(54) NUMERICAL CONTROL DEVICE AND CONTROL METHOD

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 624 days.

(21) Appl. No.: 18/002,180

(22) PCT Filed: Jul. 2, 2021

(86) PCT No.: PCT/JP2021/025148
§ 371 (c)(1),
(2) Date: Dec. 16, 2022

(87) PCT Pub. No.: WO2022/009797
PCT Pub. Date: Jan. 13, 2022

(65) Prior Publication Data

US 2023/0256554 A1 Aug. 17, 2023

(30) Foreign Application Priority Data

Jul. 7, 2020 (JP) ................................ 2020-116834

(51) Int. Cl.
*B23Q 15/12* (2006.01)
*B23Q 15/013* (2006.01)
(Continued)

(52) U.S. Cl.
CPC ........... *B23Q 15/12* (2013.01); *G05B 19/182* (2013.01); *B23Q 15/013* (2013.01); *G05B 19/19* (2013.01);
(Continued)

(58) Field of Classification Search
CPC .... G05B 19/19; G05B 19/182; G05B 19/402; G05B 19/4166; B23Q 15/12; B23Q 15/013
(Continued)

(56) References Cited

U.S. PATENT DOCUMENTS 4,347,470 A * 8/1982 Kohzai .................. G05B 19/39 318/602
4,719,579 A * 1/1988 Niwa .................. G05B 19/408 318/561
(Continued)

FOREIGN PATENT DOCUMENTS

EP 1712967 A1 * 10/2006 ......... G05B 19/4103
JP S59-142616 A 8/1984
(Continued)

OTHER PUBLICATIONS

International Search Report issued in PCT/JP2021/025148; mailed Sep. 7, 2021.
(Continued)

*Primary Examiner* — Ronald D Hartman, Jr.
(74) *Attorney, Agent, or Firm* — Studebaker Brackett PLLC

(57) ABSTRACT

The objective of the present invention is to provide a numerical control device and control method with which it is possible for hole opening to be performed at high speed and with low vibration. This numerical control device for performing hole opening continuously at prescribed intervals in a workpiece, using a machine tool, is provided with: a positioning unit for moving a hole opening tool of the machine tool to a hole opening position of the workpiece, and positioning the hole opening tool; a cutting unit; a retracting unit for retracting the hole opening tool from the workpiece; and a program executing unit for executing a machining program for causing the machine tool to continu-
(Continued)

ously machine the workpiece, by sequentially executing movement axis operation using the same control scheme for the processing performed by the positioning unit, the cutting unit, and the retracting unit.

9 Claims, 6 Drawing Sheets

(51) Int. Cl.
*G05B 19/18* (2006.01)
*G05B 19/19* (2006.01)
*G05B 19/402* (2006.01)
*G05B 19/416* (2006.01)

(52) U.S. Cl.
CPC ........ *G05B 19/402* (2013.01); *G05B 19/4166* (2013.01); *G05B 2219/45129* (2013.01)

(58) Field of Classification Search
USPC .......................................................... 700/160
See application file for complete search history.

(56) References Cited

U.S. PATENT DOCUMENTS 5,638,267 A * 6/1997 Singhose ................. G05B 5/01 700/28
5,735,646 A * 4/1998 Finn ................... G05B 19/4166 408/129
5,888,037 A * 3/1999 Fujimoto ............. G05B 19/416 408/1 R
6,317,646 B1 * 11/2001 de Caussin ...... G05B 19/40937 700/193
7,930,957 B2 * 4/2011 Travez .................. B23Q 15/12 82/118
9,599,980 B2 * 3/2017 Etou .................... G05B 19/416
10,061,294 B2 * 8/2018 Ono ..................... G05B 19/404
11,086,287 B2 * 8/2021 Takeuchi ............... B23Q 15/12
2014/0350709 A1 * 11/2014 Mochida .............. G05B 19/416 700/114
2021/0003987 A1 * 1/2021 Takeuchi ............. B23Q 15/013
2023/0185272 A1 * 6/2023 Oohashi ........... G05B 19/40938 700/179
2023/0229134 A1 * 7/2023 Itou ...................... G05B 19/402 700/1

FOREIGN PATENT DOCUMENTS

JP S62-044352 A 2/1987
JP H02-292105 A 12/1990
JP H06-180605 A 6/1994
JP H09-120310 A 5/1997
JP 2001-312309 A 11/2001
JP 2004-202594 A 7/2004
JP 2006-085575 A 3/2006
JP 2009-237929 A 10/2009
JP 2018-106350 A 7/2018
JP 2019-070953 A 5/2019
JP 2020-067921 A 4/2020
WO 2000/012258 A1 3/2000
WO 2016/157456 A1 10/2016

OTHER PUBLICATIONS

Edited by Ping, H.; "CNC Machining Center Operation and Programming Training Course"; National Defense Industry Press; Apr. 2006; total 12 pages.
Zheng, S.; "Mechanical Engineering Machinery Stamping Parts Manufacturing Technology"; Chapter 5: Agricultural Machinery Parts Cutting Technology; Oct. 2013; pp. 211-221; Mechanical Engineering Press.

* cited by examiner

OPERATION EXAMPLE OF CONTINUOUS DRILLING PROCESS

FIG. 5

| | Fast Feed Control | Cutting Feed Control | Drilling Feed Control | Low-Vibration Drilling Control |
|---|---|---|---|---|
| Maximum Feed Speed (mm/min) | 50000 | 30000 | 40000 | 20000 |
| Acceleration ($mm/sec^2$) | 20000 | 10000 | 20000 | 10000 |
| Servo Control | Standard | Highly Responsive | Highly Responsive | Highly Responsive |

NUMERICAL CONTROL DEVICE AND CONTROL METHOD

TECHNICAL FIELD

The present invention relates to a numerical control device and a control method.

BACKGROUND ART

In the known art, a numerical control device for controlling a machine tool and the like performs machining, etc. on a workpiece according to a machining program (see, for example, Patent Document 1). According to Patent Document 1, a machining program instructs a command position for a tool tip point and a command angle for a tool posture, and a machining program processing device calculates a correction reference point based on the command position and the command angle to rewrite the command position of the tool tip point to the position of the correction reference point.

Patent Document 1: Japanese Unexamined Patent Application, Publication No. 2019-70953

DISCLOSURE OF THE INVENTION

Problems to be Solved by the Invention

Meanwhile, such a numerical control device also performs a drilling process on a workpiece in accordance with a machining program. In many cases, such machining programs for drilling process adopt a machining method with a canned cycle for drilling. For example, in the canned cycle for drilling, a G code such as G81, a hole depth Z, a feed speed F, a positioning-retraction height point R, and the like are instructed in advance, whereby a drilling operation can be repeated at instructed positions only by means of a command regarding positioning axes such as the X axis and the Y axis. However, such a canned cycle is adapted to perform a fast feed control at the time of positioning and the time of retraction from the bottom of a hole, and a cutting feed control at the time of cutting a hole during a drilling process. The fast feed control is a function of, for example, moving a tool at a maximum feed speed determined depending on the machine tool, monitoring arrival of the tool to a command position, confirming positioning of the tool within a predetermined range, and then performing a next operation.

The cutting feed control is a function of moving the tool to a command position at a command feed speed, and controlling acceleration/deceleration in consideration of a next operation. While the canned cycle with these functions is for improving efficiency of the drilling process, it may adversely reduce machining efficiency in a case where holes are to be cut at narrow spacings and a positioning distance to be moved from a positioning point to a next positioning point is short. Specifically, in this case, despite the fact that the fast feed control is performed such that the positioning is carried out by moving a tool at a low speed, which corresponds to the short distance to be moved and which is unlikely to cause an error, the machining time may be extended due to monitoring the arrival of the tool at the command position.

To address this disadvantage, it is conceivable to adopt a technique of performing the fast feed control and the cutting feed control in an overlapping manner. However, the fast feed control and the cutting feed control differ from each other in servo control on a servo motor and acceleration/deceleration settings, and switching between these settings is performed at a high speed during the operation. As a result, movement of a moving shaft is stopped to be put on standby in order to secure operation or due to monitoring of the arrival at the command position, whereby smooth movement is prevented and a vibration is generated. Furthermore, the fast feed control, which is for improving efficiency, has a greater acceleration/deceleration than the cutting feed control, and causes a stronger vibration at the time of positioning especially due to stop of the moving shaft. As a result, a vibration occurs in a cutting edge of a tool, a table, and a workpiece when the tool is advanced, and exerts adverse effects such as machining failures and shortening of the life of the tool. Under the circumstances described above, there has been a demand for a technique enabling a drilling process at a high speed and with a low vibration.

Means for Solving the Problems

An aspect of the present disclosure is directed to a numerical control device for causing a machine tool to perform a drilling process of continuously cutting holes at predetermined spacings in a workpiece. The numerical control device includes: a positioning unit configured to move a drilling tool of the machine tool to a drilling position over a workpiece and position the drilling tool; a cutting unit configured to cause the drilling tool to cut a hole in the workpiece; a retraction unit configured to retract the drilling tool from the workpiece; and a program execution unit configured to execute a machining program for causing the machine tool to continuously machine the workpiece while making a moving shaft operate in a single control mode sequentially in processes performable by the positioning unit, the cutting unit, and the retraction unit.

Another aspect of the present disclosure is directed to a method of controlling a numerical control device for causing a machine tool to perform a drilling process of continuously cutting holes at predetermined spacings in a workpiece. The method includes: moving a drilling tool of the machine tool to a drilling position and positioning the drilling tool; causing the drilling tool to cut a hole in the workpiece; retracting the drilling tool from the workpiece; and executing a machining program for causing the machine tool to continuously machine the workpiece while making a moving shaft operate in a single control mode sequentially in processes performable in the positioning, the cutting, and the retracting.

Effects of the Invention

The present invention makes it possible to perform a drilling process at a high speed and with a low vibration.

BRIEF DESCRIPTION OF THE DRAWINGS

FIG. 5 illustrates an example of a parameter table; and

PREFERRED MODE FOR CARRYING OUT THE INVENTION

Figure 1:
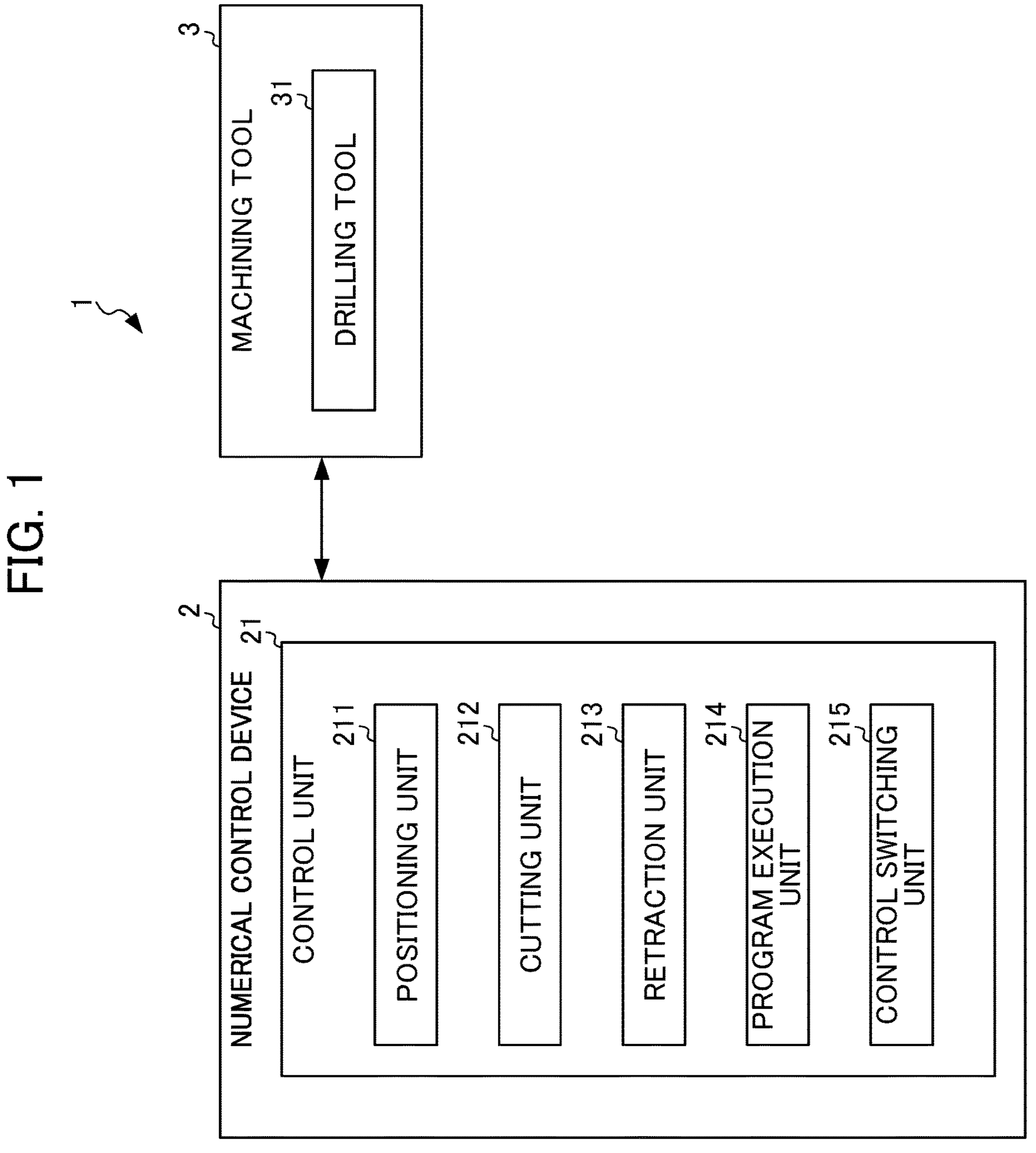
FIG. 1 is a diagram illustrating a configuration of a machining system.

An example of embodiments of the present invention will be described below. FIG. 1 is a diagram illustrating a configuration of a machining system 1. As illustrated in FIG. 1, the machining system 1 includes a numerical control device 2 and a machine tool 3.

The numerical control device 2 controls and causes the machine tool 3 to perform predetermined machining and the like. The numerical control device 2 includes a control unit 21. The control unit 21 is a processor such as a central processing unit (CPU), and functions as a positioning unit 211, a cutting unit 212, a retraction unit 213, a program execution unit 214, and a control switching unit 215 by executing a program stored in a storage unit (not shown).

Figure 2:
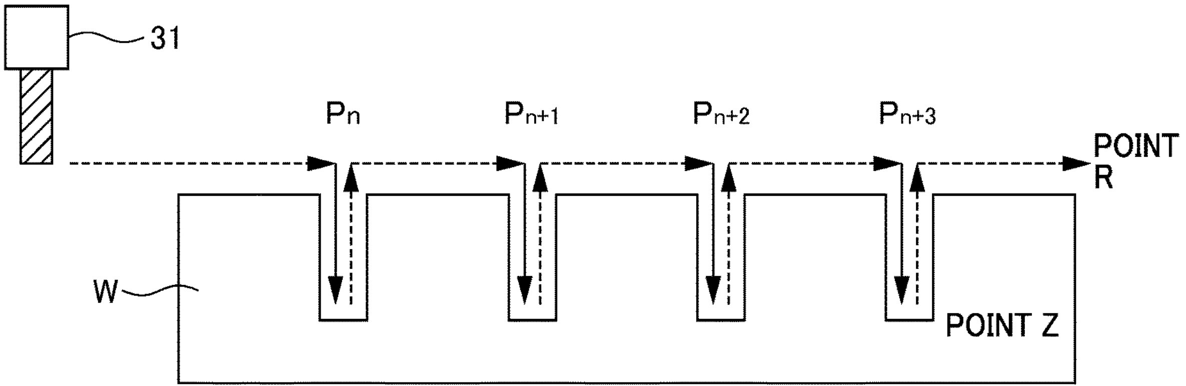
FIG. 2 is a diagram illustrating an operation example of a drilling process.

The machine tool 3 is a device that performs, for example, predetermined machining such as cutting and tool measurement under the control of the numerical control device 2. FIG. 2 is a diagram illustrating an outline of the machine tool 3.

The machine tool 3 includes, for example, a motor to be driven for machining a workpiece W, a main shaft and a feed shaft attached to the motor, jigs and tools associated with the shafts, a table T on which the workpiece W is fastened. The machine tool 3 drives the motor based on an operation command outputted from the numerical control device 2, thereby performing the predetermined machining, Specifically, the machine tool 3 performs a drilling process to continuously cut holes at predetermined spacings in the workpiece. The machine tool 3 includes drilling tools 31 for the drilling process.

Next, an operation of the machining system 1 will be described. The drilling tools 31 are of different types and provided according to the purposes of machining. Replacement of the drilling tools 31 is performed while the drilling tools 31 are attached to dedicated tool holders. Each drilling tool 31 is assigned with a unique tool number.

The positioning unit 211 moves the drilling tool 31 of the machine tool 3 to a drilling position over the workpiece W and thereby positions the drilling tool 31. The cutting unit 212 causes drilling tool 31 to cut the workpiece W to form holes in the workpiece W. Subsequent to the formation of the hole in the workpiece W, the retraction unit 213 retracts the drilling tool 31 from the hole in the workpiece W.

FIG. 2 is a diagram illustrating an operation example of the drilling process. As illustrated in FIG. 2, the machine tool 3 performs continuous machining on the workpiece W by continuously performing the following operations: positioning of the drilling tool 31 with respect to the workpiece W, cutting the workpiece W with the drilling tool 31, and retracting the drilling tool 31 from the workpiece W. In other words, the numerical control device 2 causes the machine tool 3 to continuously machine the workpiece W by way of the processes performed by the positioning unit 211, the cutting unit 212, and the retraction unit 213.

Referring back to FIG. 1, the program execution unit 214 executes a machining program for causing the machine tool 3 to continuously machine the workpiece W by way of the processes performed by the positioning unit 211, the cutting unit 212, and the retraction unit 213.

Conventionally, such a numerical control device 2 performs the fast feed control to position a drilling tool 31 with respect to a workpiece W and to retract the drilling tool 31 from the workpiece W, and performs the cutting feed control to cut the workpiece W. However, in the conventional repetitive operation (e.g., a canned cycle) that performs the fast feed control and the cutting feed control, adverse effects of the high acceleration/deceleration of the fast feed control and stop of the moving shaft that is made for monitoring arrival at the command position render it likely for a strong vibration to occur at the time of positioning, and as a result, the quality of the drilling process is affected.

Furthermore, the fast feed control and the cutting feed control, which are performed for different purposes, differ from each other in the maximum feed speed, whether to monitor the arrival at the command position, the speed control mode, settings for controlling the servo motor. For this reason, a conventional machine tool 3 takes time to switch the speed control modes and the settings for controlling the servo motor and needs to put the shaft movement on standby in order to secure operation. Therefore, the conventional machine tool 3 may take a long time to complete a drilling process.

It is possible for the numerical control device 2 to perform the drilling process in accordance with a macro program so as to perform the positioning, cutting, and retraction by the cutting feed control, instead of employing the repetitive operation (e.g., the canned cycle). However, the creation of such a macro program requires a person skilled in programming. In a case where the maximum feed speed of the cutting feed control is low, the macro program is limited to use in machining in which the spacings between holes are short enough to prevent the maximum feed speed from being reached.

The numerical control device 2 according to the present embodiment causes the machine tool 3 to continuously machine the workpiece W by way of the processes performed by the positioning unit 211, the cutting unit 212, the retraction unit 213, and the program execution unit 214, thereby enabling elimination of the above-described disadvantages of the known art.

Here, the machining program contains a canned cycle for controlling the positioning with respect to the workpiece W, the cutting of the workpiece W, and the retraction from the workpiece W by a single control mode of control modes provided to the machine tool 3. The control modes contain, for the fast feed control and the cutting feed control, maximum feed speeds, control modes and settings for acceleration/deceleration, settings for controlling a servo motor, and the like. The machining program is controlled by the cutting feed control that does not stop a moving shaft to monitor arrival at a command position.

For the canned cycle, the program execution unit 214 sets a feed speed for positioning with respect to the workpiece W and a feed speed for retraction from the workpiece W to a predetermined set value. The set value may be a fixed value, the maximum feed speed of the cutting feed control, or that of the fast feed control.

In a case where the positioning distance to be moved is long and a comparison between the feed control modes indicates that the maximum feed speed of the cutting feed control is lower than that of the fast feed control, the control switching unit 215 can switch the control mode for the positioning with respect to the workpiece W and the retraction from the workpiece W to the fast feed control, based on the positioning distance over the workpiece W.

Specifically, the switching of the control modes is performed in the following manner. A total positioning time is calculated from a switching time necessary for switching acceleration/deceleration variables, feed speeds, servo motor control modes, etc. of the fast feed control and the cutting feed control, and a time necessary for the positioning. If the positioning distance to be moved over the workpiece W is equal to or greater than a predetermined distance in case of which the total positioning time under the fast feed control is shorter than the total positioning time under the cutting feed control, the control switching unit 215 switches the feed control for the positioning with respect to the workpiece W to the fast feed control. The control switching unit 215 then switches the acceleration/deceleration variable, the feed speed, the servo motor control mode, etc. for cutting the workpiece W to those of the cutting feed control. It is also possible to switch only a part of the foregoing, such as the maximum feed speed and the acceleration/deceleration settings.

If the positioning distance to be moved over the workpiece W is less than the predetermined distance, the control switching unit 215 switches the feed control for the positioning with respect to the workpiece W to the cutting feed control.

For example, the predetermined distance may be such a distance that allows the time required for the entire drilling process to be shortened in the case of performing the positioning with respect to the workpiece W by the fast feed control, in comparison with the case of performing the positioning by the cutting feed control.

The control switching unit 215 monitors a movement command for the drilling tool 31 contained in the machining program, and switches the cutting feed control to the fast feed control in a case where the positioning distance to be moved by the drilling tool 31 is greater than the predetermined distance. The control switching unit 215 maintains the cutting feed control in a case where the positioning distance to be moved by the drilling tool 31 is equal to or less than the predetermined distance.

Thus, in the case where the positioning distance to be moved over the workpiece W is equal to or greater than the predetermined distance, the machining system 1 switches the maximum feed speed and the acceleration/deceleration variable for the positioning with respect to the workpiece W to a value approximate to the acceleration/deceleration of the fast feed control, which is the highest acceleration/deceleration of the machine tool 3, thereby making it possible to perform the positioning with respect to the workpiece W more quickly than in the case where the acceleration/deceleration variable is set to that of the cutting feed control.

Further, since contour control is not necessary for the drilling process, the set values as the initial setting of acceleration/deceleration, the maximum feed speed, etc. to be used in the cutting feed control may be the same as those of the fast feed control. Unlike the fast feed control, the cutting feed control does include monitoring the arrival at the command position, and accordingly, does not stop the moving shaft, thereby enabling continuous operation at the highest acceleration/deceleration of the machine tool 3.

Figure 3:
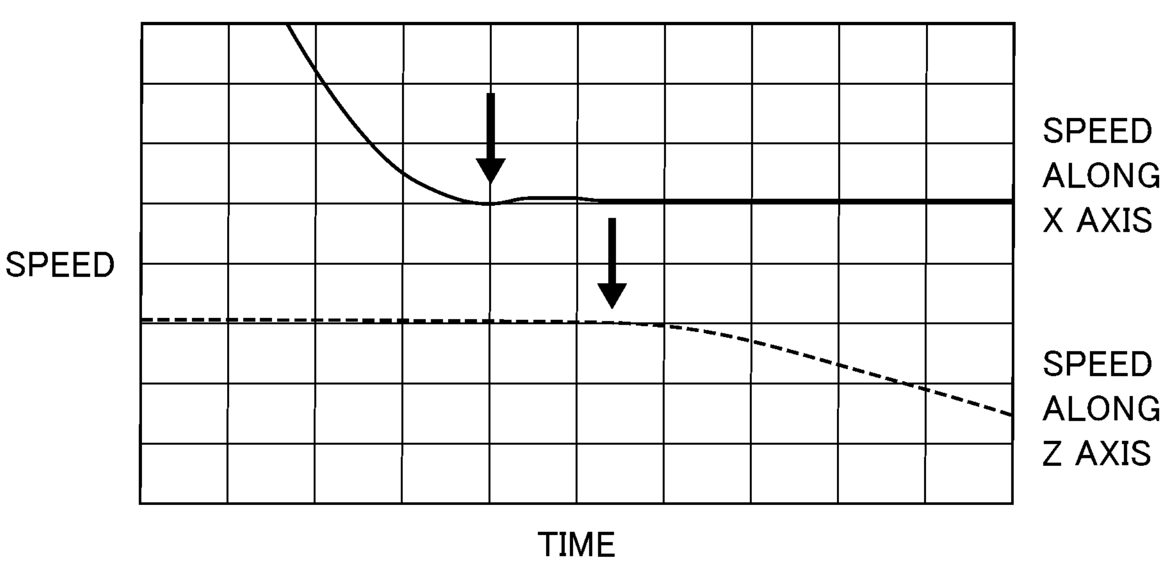
FIG. 3 is a diagram illustrating a speed along an X axis and a speed along a Z axis in a normal drilling process.
Figure 4:
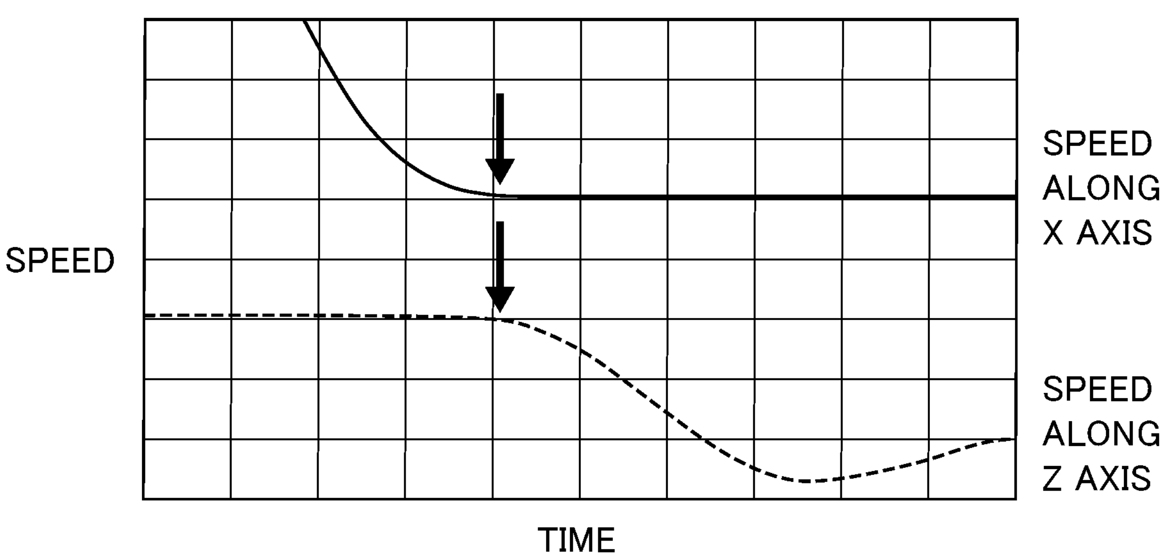
FIG. 4 is a diagram illustrating a speed along an X axis and a speed along a Z axis in a drilling process by a single control mode.

FIG. 3 is a diagram illustrating a speed along an X axis and a speed along a Z axis in a normal drilling process. FIG. 4 is a diagram illustrating a speed along an X axis and a speed along a Z axis in a drilling process by a single control mode. In the example shown in FIG. 3, fast feed control is performed for movement in the X axis direction, and cutting forward control is performed for movement in the Z axis direction. In the example shown in FIG. 4, the cutting feed control is performed as the single control mode for both the movement in the X axis direction and the movement in the Z axis direction. In the example shown in FIG. 3, switching the control modes and monitoring the arrival at the command position take place subsequent to the positioning in the X axis direction and causes a delay in the start of movement in the Z axis direction. In contrast, according to the cutting feed control shown in FIG. 4, the movement in the Z axis direction starts immediately following the positioning in the X axis direction, without delay.

The numerical control device 2 may store, in the form of a parameter table, at least one feed control mode containing a preset maximum feed speed, a preset acceleration, and a preset servo control, in a storage unit (not shown) of the numerical control device 2. The control switching unit 215 may switch control for the moving shaft by referring to the parameter table before a start of the drilling process. That is, the single control mode described above can be switched by means of the parameter table storing at least one feed control mode.

FIG. 5 illustrates an example of the parameter table. In the parameter table illustrated in FIG. 5, the feed control mode includes a fast feed control, a cutting feed control, a drilling control, and a low-vibration drilling control. The parameter table specifies settings of the maximum feed speed, acceleration, and servo control for each of the feed control modes.

Figure 6:
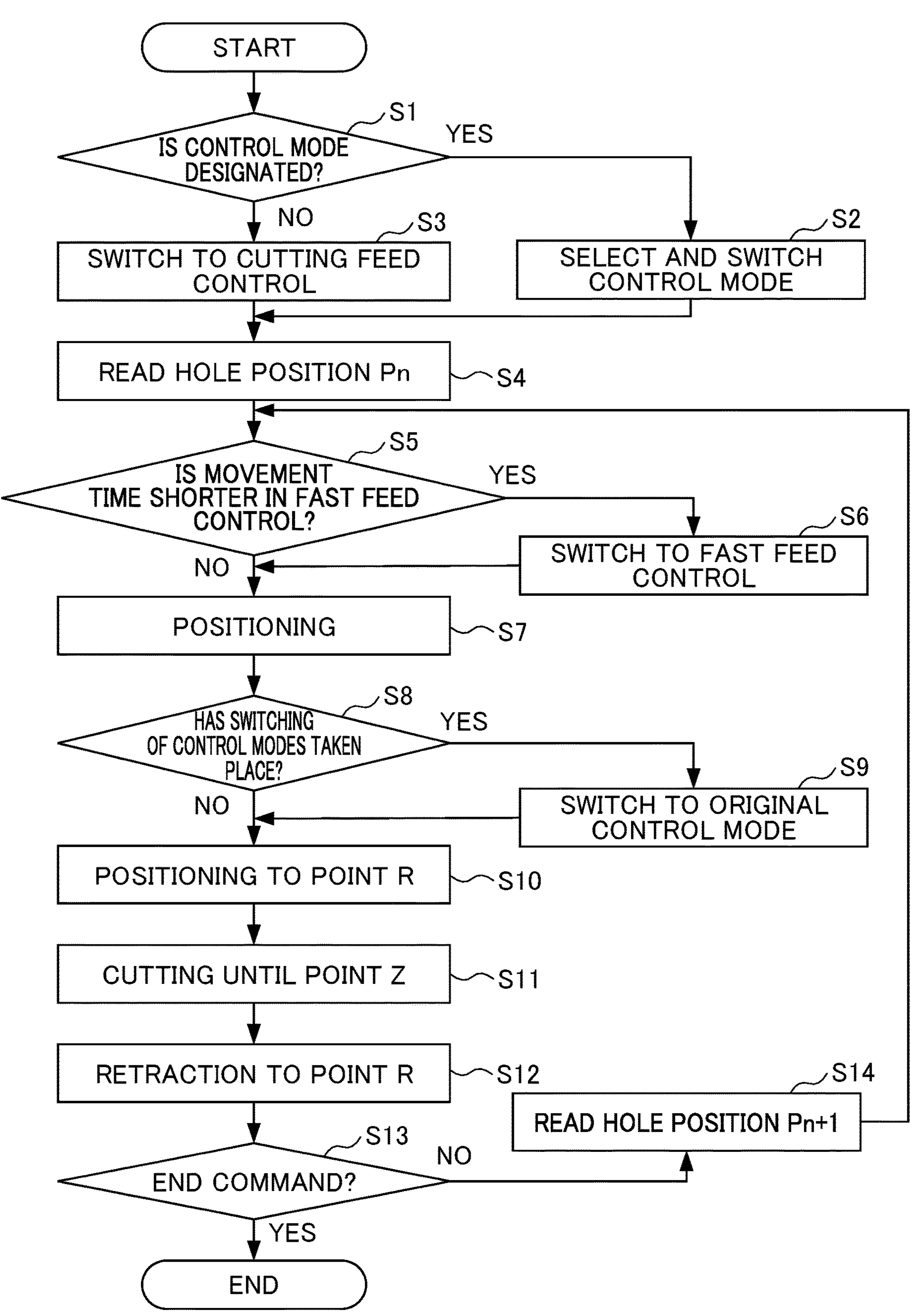
FIG. 6 is a flowchart illustrating a process of switching control modes during drilling that is performed according to a machining program read by a numerical control device 2.

FIG. 6 is a flowchart illustrating a process of switching control modes during drilling that is performed according to a machining program read by the numerical control device 2.

In Step S1, the numerical control device 2 starts reading the machining program. The numerical control device 2 then determines whether or not a control mode is designated in the machining program. If the control mode is designated (YES), the process proceeds to Step S2. If the control mode is not designated (NO), the process proceeds to Step S3.

In Step S2, the numerical control device 2 refers to a parameter table, selects the feed control mode designated in the machining program, and switches a current control mode to the selected feed control mode.

In Step S3, the numerical control device 2 switches a current control mode to the cutting feed control. In Step S4, the numerical control device 2 reads a hole position Pn (see, for example, FIG. 2) from the machining program.

In Step S5, the numerical control device 2 determines whether or not a movement time for which the drilling tool 31 moves will be shorter in the fast feed control than in the currently-set control mode. If the movement time will be shorter in the fast feed control (YES), the process proceeds to Step S6. If the movement time will be longer in the fast feed control (NO), the process proceeds to Step S7.

In Step S6, the numerical control device 2 switches the current control mode to the fast feed control. In Step S7, the numerical control device 2 performs positioning at the hole position Pn read in Step S4.

In Step S8, the numerical control device 2 determines whether or not switching of the control modes has taken place in Step S6. If the switching of the control modes has taken place (YES), the process proceeds to Step S9. If the switching of the control modes has not taken place (NO), the process proceeds to Step S10.

In Step S9, the numerical control device 2 switches the current control mode to the control mode before switching in Step S6 (the original control mode). In Step S10, the numerical control device 2 positions the drilling tool 31 at a positioning-retraction height point R.

In Step S11, the numerical control device 2 causes the drilling tool 31 to perform cutting until a target cutting depth point Z. In Step S12, the numerical control device 2 retracts the drilling tool 31 to the positioning-retraction height point R.

In Step S13, the numerical control device 2 determines whether or not G80 (end command) is designated in the machining program. If the end command is designated (YES), the process is then ended. If the end command is not designated (NO), the process proceeds to Step S14.

In Step S14, the numerical control device 2 reads a hole position Pn+1 (see, for example, FIG. 2) from the machining program, and then the process proceeds to Step S5.

As described above, according to the present embodiment, the numerical control device 2 includes: the positioning unit 211 configured to move the drilling tool 31 of the machine tool 3 to a drilling position over the workpiece W and position the drilling tool 31; the cutting unit 212 configured to cause the drilling tool 31 to cut a hole in the workpiece W; the retraction unit 213 configured to retract the drilling tool 31 from the workpiece W; and the program execution unit 214 configured to execute a machining program for causing the machine tool 3 to continuously machine the workpiece W while making a moving shaft operate in a single control mode sequentially in the processes performable by the positioning unit 211, the cutting unit 212, and the retraction unit 213. Due to this feature, the numerical control device 2 can perform the drilling process at a high speed and with a low vibration by means of the machining program for continuously machining the workpiece W.

The machining program contains a canned cycle that controls positioning with respect to the workpiece W, cutting of the workpiece W, and retraction from the workpiece W by the cutting feed control of the machine tool 3. Due to this feature, the numerical control device 2 can perform the drilling process at a high speed and with a low vibration by using the canned cycle that performs the positioning with respect to the workpiece W, cutting of the workpiece W, and retraction from the workpiece W by the cutting feed control of the machine tool 3.

The single control mode includes the cutting feed control or the fast feed control. Due to this feature, the numerical control device 2 can perform the drilling process at a high speed and with a low vibration by the cutting feed control or the fast feed control. The single control mode can be switched by means of a parameter table storing at least one feed control mode. The single control mode includes a control mode different from a control mode of an operation that affects tool change in the machine tool 3. Thus, the numerical control device 2 can appropriately switch the control modes.

During the canned cycle, the program execution unit 214 sets the cutting feed control for the positioning with respect to the workpiece W and retraction from the workpiece W to a predetermined set value. Due to this feature, for example, the numerical control device 2 can perform the drilling process at a further increased speed by setting the cutting feed control to a value corresponding to a high speed, and can further reduce the vibration caused due to the drilling process by setting the cutting feed control to a value corresponding to a low speed.

The program execution unit 214 can set a plurality of acceleration/deceleration variables for use in the cutting feed control. The control switching unit 215 can perform switching between the plurality of acceleration/deceleration variables for the positioning with respect to the workpiece W and the cutting of the workpiece W based on a machining distance for the workpiece W. With this feature, in a case where the machining distance for the workpiece W is equal to or greater than a predetermined distance, the numerical control device 2 switches the acceleration/deceleration variable for the positioning with respect to the workpiece W to a value approximate to an acceleration/deceleration of the fast feed, which is the highest acceleration/deceleration of the machine tool 3. As a result, the machining system 1 can perform the positioning with respect to the workpiece W more quickly than in a case where the acceleration/deceleration variable is set to that of the cutting feed.

The control switching unit 215 monitors a movement command for the drilling tool 31 contained in the machining program, and switches the cutting feed speed to the fast feed speed in a case where a distance to be moved by the drilling tool 31 exceeds a predetermined distance. With this feature, the numerical control device 2 can suitably perform switching between the cutting feed and the fast feed according to the distance to be moved by the drilling tool 31.

Since contour control is not necessary for the drilling process, setting the acceleration/deceleration variable for use for controlling the cutting feed speed to the same value as that of the fast feed operation enables high-speed machining.

For a machine tool equipped with a turret-type tool changer, in a movement range in which the movement of the moving shaft for tool change affects the turret, the acceleration/deceleration variable or the control mode change depending on the weight of the tool attached to the turret or the total weight of all the tools. In this case, a drilling process in a movement range which does not affect the movement of the turret is performed with an acceleration/deceleration variable different from that of the operation of the turret or by a control mode different from that of the operation of the turret, whereby high-speed machining can be achieved even with a tool having a heavy tool weight.

While embodiments of the present invention have been described in the foregoing, the embodiments described above are not intended to limit the present invention. The effects described in the above embodiments are merely the most favorable ones of the effects exerted by the present invention. The effects of the present invention are not limited to those described above.

EXPLANATION OF REFERENCE NUMERALS

1: Machining system
2: Numerical control device
3: Machining tool
21: Control unit
211: Positioning unit
212: Cutting unit
213: Retraction unit
214: Program execution unit
215: Control switching unit

The invention claimed is:

1. A numerical control device for causing a machine tool to perform a drilling process of continuously cutting holes at predetermined spacings in a workpiece, the numerical control device comprising:

a processor, wherein the processor is configured to:

move a drilling tool of the machine tool to a drilling position over a workpiece and position the drilling tool;

cause the drilling tool to cut a hole in the workpiece;

retract the drilling tool from the workpiece; and execute a machining program for causing the machine tool to continuously machine the workpiece while making a moving shaft operate in a single control mode sequentially in processes performable by positioning the drilling tool, cutting the hole in the workpiece and retracting the drilling tool.

2. The numerical control device according to claim 1, wherein the machining program contains a canned cycle that controls positioning with respect to the workpiece, cutting of the workpiece, and retraction from the workpiece by the single control mode of the machine tool.

3. The numerical control device according to claim 1, wherein the single control mode includes a cutting feed control or a fast feed control.

4. The numerical control device according to claim 3, wherein the single control mode is switchable by means of a parameter table storing at least one feed control mode.

5. The numerical control device according to claim 3, wherein the single control mode includes a control mode different from a control mode of an operation that affects tool change in the machine tool.

6. The numerical control device according to claim 2, wherein during the canned cycle, the processor sets a cutting feed speed for the positioning with respect to the workpiece and the retraction from workpiece to a predetermined set value.

7. The numerical control device according to claim 1, wherein the processor is capable of setting a plurality of acceleration/deceleration variables for use in the single control mode, and wherein the processor is capable of switching a feed control including the plurality of acceleration/deceleration variables for positioning with respect to the workpiece to a fast feed control, based on a positioning distance to be moved over the workpiece.

8. The numerical control device according to claim 1, wherein the processor monitors a movement command for the drilling tool contained in the machining program, and performs switching from a cutting feed control to a fast feed control in a case where a positioning distance to be moved by the drilling tool exceeds a predetermined distance.

9. A method of controlling a numerical control device for causing a machine tool to perform a drilling process of continuously cutting holes at predetermined spacings in a workpiece, the method comprising:

moving a drilling tool of the machine tool to a drilling position and positioning the drilling tool;

causing the drilling tool to cut a hole in the workpiece;

retracting the drilling tool from the workpiece; and executing a machining program for causing the machine tool to continuously machine the workpiece while making a moving shaft operate in a single control mode sequentially in processes performable in the positioning, the cutting, and the retracting.

* * * * *